United States Patent
Sugiyama et al.

(10) Patent No.: US 8,615,268 B2
(45) Date of Patent: Dec. 24, 2013

(54) WIRELESS COMMUNICATIONS DEVICE, AND METHOD AND PROGRAM FOR DETERMINING RECEPTION LEVEL OF THE WIRELESS COMMUNICATIONS DEVICE

(75) Inventors: Yoshikazu Sugiyama, Tokyo (JP); Katsuya Miyata, Tokyo (JP)

(73) Assignee: NEC Corporation, Tokyo (JP)

( * ) Notice: Subject to any disclaimer, the term of this patent is extended or adjusted under 35 U.S.C. 154(b) by 131 days.

(21) Appl. No.: 12/916,939

(22) Filed: Nov. 1, 2010

(65) Prior Publication Data

US 2011/0105108 A1    May 5, 2011

(30) Foreign Application Priority Data

Nov. 2, 2009 (JP) ................................. 2009-252496
Aug. 5, 2010 (JP) ................................. 2010-176692

(51) Int. Cl.
*H04B 7/00* (2006.01)
(52) U.S. Cl.
USPC ........ 455/525; 455/411; 455/422.1; 370/311; 370/328
(58) Field of Classification Search
USPC ................ 455/411, 422.1, 525; 370/311, 328
See application file for complete search history.

(56) References Cited

U.S. PATENT DOCUMENTS

| | | | | |
|---|---|---|---|---|
| 5,481,571 | A * | 1/1996 | Balachandran et al. | 375/347 |
| 5,507,010 | A * | 4/1996 | Ahonen | 455/67.14 |
| 6,968,169 | B2 * | 11/2005 | Miyatani | 455/272 |
| 7,515,714 | B2 * | 4/2009 | Orihashi et al. | 380/255 |
| 8,369,300 | B2 * | 2/2013 | Kim et al. | 370/344 |
| 2005/0123138 | A1 * | 6/2005 | Abe et al. | 380/255 |
| 2007/0243839 | A1 * | 10/2007 | Kostic | 455/132 |
| 2007/0280340 | A1 * | 12/2007 | Hwang et al. | 375/222 |
| 2008/0069251 | A1 * | 3/2008 | Imai et al. | 375/260 |
| 2008/0089269 | A1 * | 4/2008 | Tsutsui | 370/316 |
| 2008/0095132 | A1 | 4/2008 | Lindoff et al. | |
| 2008/0253353 | A1 * | 10/2008 | Feher | 370/347 |
| 2008/0260073 | A1 * | 10/2008 | Jin et al. | 375/340 |
| 2009/0137214 | A1 * | 5/2009 | Hofmann et al. | 455/82 |
| 2010/0227639 | A1 * | 9/2010 | Kim et al. | 455/525 |
| 2010/0296419 | A1 * | 11/2010 | Kim et al. | 370/297 |

FOREIGN PATENT DOCUMENTS

| | | |
|---|---|---|
| JP | 3101437 | 8/2000 |
| JP | 2003-188794 | 7/2003 |
| JP | 2005-124209 | 5/2005 |
| JP | 2006-180320 | 7/2006 |

(Continued)

OTHER PUBLICATIONS

Japanese Official Action—2010-176692—Jul. 23, 2013.

*Primary Examiner* — Meless N Zewdu
*Assistant Examiner* — Qun Shen
(74) *Attorney, Agent, or Firm* — Young & Thompson

(57) ABSTRACT

A control unit 19 switches four antennas 111 to 114 at predetermined time intervals, receives signals from an LTE base station 2 using four receiving antennas 111 to 114, and receives signals from a GSM base station 3 using the four antennas 111 to 114. The control unit 19 determines the reception level in a cell 2c of the LTE base station 2 on the basis of signal strengths detected by a received signal detector 14p when signals are received from the LTE base station 2 using the four antennas 111 to 114. In addition, the control unit 19 determines the reception level in a cell 3c of the GSM base station 3 on the basis of four signal strengths detected by the received signal detector 14p when signals are received from the GSM base station 3 using the four antennas 111 to 114.

11 Claims, 14 Drawing Sheets

(56) References Cited

FOREIGN PATENT DOCUMENTS

| JP | 2007-195201 | 8/2007 |
| JP | 2009-111644 | 5/2009 |
| WO | 03/084253 | 10/2003 |
| WO | 2008/085176 | 7/2008 |
| WO | 2009/065469 | 5/2009 |

* cited by examiner

FIG. 13

| Antenna | | | | |
|---|---|---|---|---|
| Antenna 111 | Slt161 / 8×8MIMO | Slt162 / 4×4MIMO | Slt163 / MONITORING GSM NETWORK | Slt164 / 8×8MIMO |
| Antenna 112 | Slt171 / 8×8MIMO | Slt172 / 4×4MIMO | Slt173 / MONITORING GSM NETWORK | Slt174 / 8×8MIMO |
| Antenna 113 | Slt181 / 8×8MIMO | Slt182 / 4×4MIMO | Slt183 / 4×4MIMO | Slt185 / 8×8MIMO |
| Antenna 114 | Slt191 / 8×8MIMO | Slt192 / 4×4MIMO | Slt193 / MONITORING GSM NETWORK | Slt95 / 8×8MIMO |
| Antenna 115 | Slt201 / 8×8MIMO | Slt202 / MONITORING GSM NETWORK | Slt203 / 4×4MIMO | Slt204 / 8×8MIMO |
| Antenna 116 | Slt211 / 8×8MIMO | Slt212 / MONITORING GSM NETWORK | Slt213 / 4×4MIMO | Slt214 / 8×8MIMO |
| Antenna 117 | Slt221 / 8×8MIMO | Slt222 / MONITORING GSM NETWORK | Slt223 / ELECTRIC CURRENT SUPPLY HALTED | Slt224 / 8×8MIMO |
| Antenna 118 | Slt231 / 8×8MIMO | Slt232 / MONITORING GSM NETWORK | Slt233 / ELECTRIC CURRENT SUPPLY HALTED | Slt234 / 8×8MIMO | t41

WIRELESS COMMUNICATIONS DEVICE, AND METHOD AND PROGRAM FOR DETERMINING RECEPTION LEVEL OF THE WIRELESS COMMUNICATIONS DEVICE

INCORPORATION BY REFERENCE

This application is based on Japanese Patent Application No. 2009-252496 filed on Nov. 2, 2009, and Japanese Patent Application No. 2010-176692 filed on Aug. 5, 2010, including specification, claims, drawings and summary. The disclosures of the above Japanese Patent Applications are incorporated herein by reference in their entirety.

TECHNICAL FIELD

The present invention relates to a wireless communications device and a method and program for determining the reception level of the wireless communications device.

BACKGROUND ART

Wireless communication technology is progressing every day and accompanying that progress, various mobile telephone formats have appeared, including second-generation mobile phone formats, third-generation mobile phone formats and 3.9-generation mobile phone formats.

Second-generation mobile formats include the GSM (Global System for Mobile communications) format, the IS-95 format and the PDC (Personal Digital Cellular) format.

Diversity reception technology, which is one type of wireless communication technology, has been practically used in mobile phone handsets using the GSM format and the IS-95 format. In addition, diversity reception technology in the PDC format is disclosed in Japanese Patent No. 3101437.

Diversity reception technology includes (1) antenna diversity technology where an antenna with a high reception level is selected from a plurality of antennas, and (2) synthesis diversity technology where optimum data is decoded by synthesizing or switching received signals on the strength and phase of signals received from a plurality of antennas.

On the other hand, MIMO (Multi Input Multi Output) technology which is equipped with a plurality of antennas for both the sending side and the receiving side and which accomplishes high-speed, large-volume information transmissions has been practically used in wireless communications devices on the wireless LAN (Local Area Network) 802.11n format.

Among the third generation mobile phone formats are the W-CDMA (Wide-Band Code Division Multiplex Access) format and cdma 2000-1x. With the W-CDMA format or cdma 2000-1x, handover technology has been commercialized for moving between base stations without interrupting communications.

Handover technology that determines the magnitude of the reception level and hands over communications from a cell of a base station capable of sending and receiving the signal to a cell of another base station is disclosed in Unexamined Japanese Patent Application KOKAI Publication No. 2009-111644.

Among 3.9-generation mobile phone formats is the LTE (Long Term Evolution) format. With the LTE format, MIMO technology using four receiving antennas is employed and handover technology is also standardized.

There is an LTE-GSM dual mode transceiver that supports both the LTE format and the GSM format. With an LTE-GSM dual mode transceiver, when for example a mobile phone existing in a cell of a first base station using the LTE format is handed over to a cell of a second base station using the GSM format, it is necessary to accurately monitor the reception level of the signal received from the second base station.

However, the diversity reception technology disclosed in Japanese Patent No. 3101437 and the handover technology disclosed in Unexamined Japanese Patent Application KOKAI Publication No. 2009-111644 cannot accurately monitor the reception level of signals received from a first base station and a second base station with differing wireless formats.

In consideration of the foregoing, it is an exemplary object of the present invention to provide a wireless communications device that can monitor the reception level of signals received from a plurality of base stations with differing wireless formats, and a method and program for determining reception levels in the wireless communications device.

SUMMARY

A wireless communications device according to a first exemplary aspect of the present invention is provided with:

N (where N≥2) receiving antennas for receiving signals from a first base station and a second base station having differing wireless formats;

a reception control unit for switching the N receiving antennas at predetermined time intervals, receiving signals from the first base station using M (where 2≤M≤N) of the receiving antennas and receiving signals from the second base station using the N receiving antennas;

a signal strength detector for detecting signal strengths respectively corresponding to signals received from the first base station or the second base station by the receiving antennas; and, reception level determination units for determining a reception level in a cell of the first base station on the basis of the M signal strengths detected by the signal strength detector when signals are received from the first base station using M of the receiving antennas, and determining a reception level in a cell of the second base station on the basis of N signal strengths detected by the signal strength detector when signals are received from the second base station using the N receiving antennas.

A reception level determination method for a wireless communications device according to a second exemplary aspect of the present invention is:

a reception level determination method for a wireless communications device comprising N (where N≥2) receiving antennas for receiving signals from a first base station and a second base station having differing wireless formats, comprising:

a step for switching the N receiving antennas at predetermined time intervals, receiving signals from the first base station using M (where 2≤M≤N) of the receiving antennas and receiving signals from the second base station using the N receiving antennas;

a step for detecting the respective signals strengths corresponding to signals received from the first base station or the second base station by the receiving antennas; and a step for acquiring both reception levels by determining the reception level in a cell of the first base station on the basis of the M signal strengths detected when signals are received from the first base station using M of the receiving antennas, and determining the reception level in a cell of the second base station on the basis of N signal strengths detected when signals are received from the second base station using the N receiving antennas.

A computer-readable recording medium according to a third exemplary aspect of the present invention stores a program that causes a computer to execute:

a procedure for switching N (where N≥2) receiving antennas receiving signals from a first base station and a second base station having differing wireless formats at predetermined time intervals, receiving signals from the first base station using M (where 2≤M≤N) of the receiving antennas and receiving signals from the second base station using the N receiving antennas;

a procedure for detecting the respective signals strengths corresponding to signals received from the first base station or the second base station by the receiving antennas; and a procedure for acquiring both reception levels by determining the reception level in a cell of the first base station on the basis of the M signal strengths detected when signals are received from the first base station using M of the receiving antennas, and determining the reception level in a cell of the second base station on the basis of N signal strengths detected when signals are received from the second base station using the N receiving antennas.

BRIEF DESCRIPTION OF THE DRAWINGS

These objects and other objects and advantages of the present invention will become more apparent upon reading of the following detailed description and the accompanying drawings in which:

FIG. 13 is a timing chart showing the timing of monitoring reception level on an LTE network and reception level on a GSM network during data communications in the sixth exemplary embodiment of the present invention.

EXEMPLARY EMBODIMENTS

A wireless communications device according to exemplary embodiments of the present invention is described below with reference to the drawings. In the exemplary embodiments below, the wireless communications device is explained as a wireless transceiver.

(Exemplary Embodiment 1)

Figure 1:
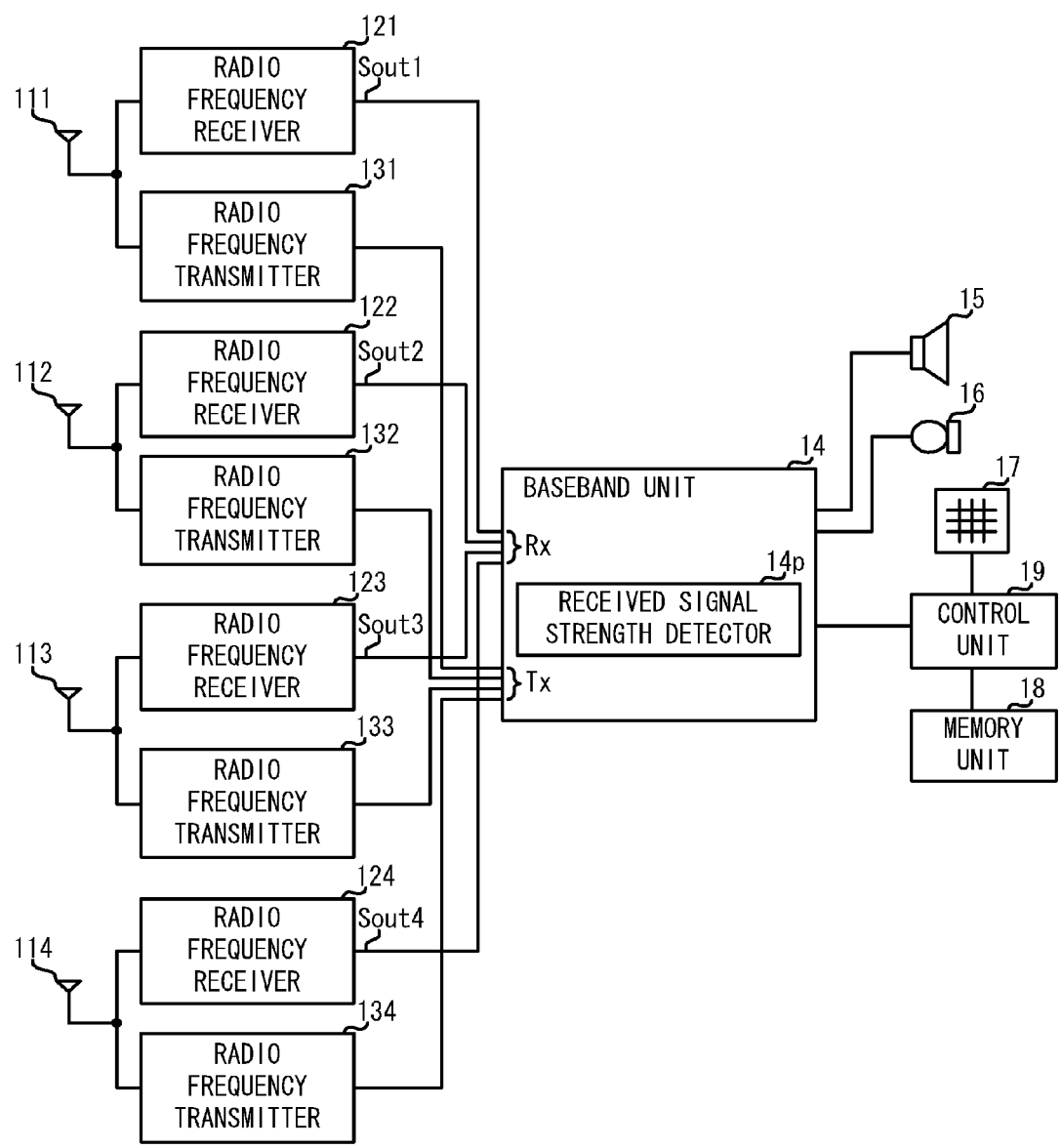
FIG. 1 is a block diagram showing the composition of a wireless transceiver according to a first exemplary embodiment of the present invention.

As shown in FIG. 1, a wireless transceiver 1 according to the first exemplary embodiment includes to 114, radio frequency receivers 121 to 124, radio frequency transmitters 131 to 134, a baseband unit 14, a speaker 15, a microphone 16, a dial key 17, a memory unit 18 and a control unit 19.

Figure 2:
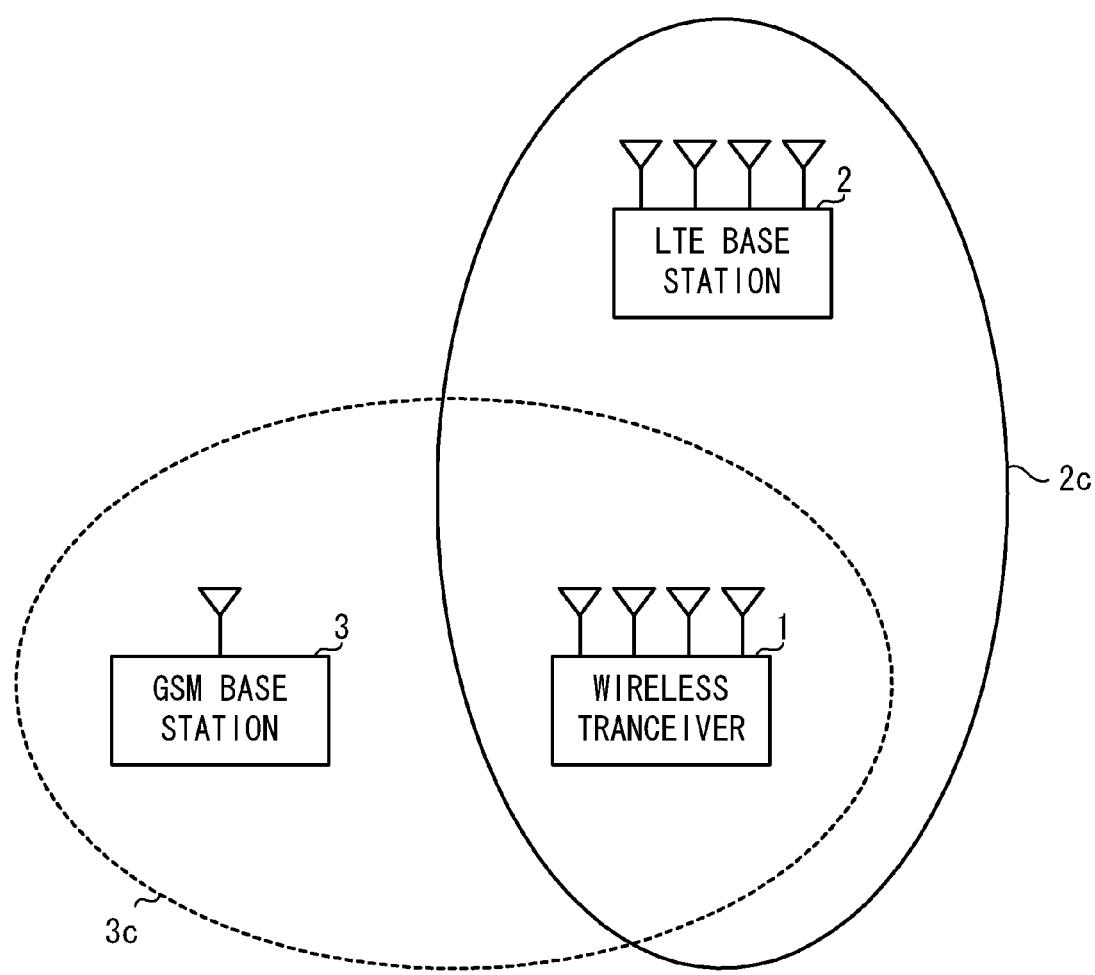
FIG. 2 shows the positional relationship among the wireless transceiver shown in FIG. 1, an LTE base station and a GSM base station.

The wireless transceiver 1 is an LTE-GSM dual mode transceiver. As shown in FIG. 2, the position of the wireless transceiver 1 is registered in both an LTE network and a GSM network.

An LTE base station 2 is a base station for accomplishing communications with the wireless transceiver 1 in accordance with LTE format.

A GSM base station 3 is a base station for accomplishing communications with the wireless transceiver 1 in accordance with GSM format. The GSM base station 3 has one notification channel used for sending timing references and synchronization information.

When the wireless transceiver 1 is in a cell 2c where signals from the LTE base station 2 can be received, the position of the wireless transceiver 1 is recorded in the LTE network. At the same time, when the wireless transceiver 1 is in a cell 3c where signals from the GSM base station 3 can be received, the wireless transceiver 1 can detect the reception level of the notification channel from the GSM base station 3. The wireless transceiver 1 accomplishes data communications with the LTE network. In addition, the wireless transceiver 1 accomplishes audio communications with the GSM network.

The antennas 111 to 114 of the wireless transceiver 1 shown in FIG. 1 receive radio waves from the LTE base station 2 and radio waves from the GSM base station 3. By providing the four antennas 111 to 114, the wireless transceiver 1 can accomplish 4×4 MIMO operations.

The 4×4 MIMO operations correspond to Category 5 (TS36.306 Table 4.1-1) in LTE standards.

In order to obtain a space multiplexing effect with the MIMO format, each of the antennas 111 to 114 of the wireless transceiver 1 should have a low cross-correlation coefficient in other words should be loosely coupled.

As one example of this, when the distance between antennas is more than $\lambda/2$, where $\lambda$ is the wavelength of the carrier waves, the cross-correlation coefficient of the respective signal strengths corresponding to the received signals becomes low. The cross-correlation coefficient becoming low means the respective signal strengths are not correlated.

For this reason, in the first exemplary embodiment, the distance between the antennas 111 to 114 in the wireless transceiver 1 is more than $\lambda/2$, where $\lambda$ is the wavelength of the carrier waves.

The antennas 111 to 114 are connected respectively to the radio frequency receiver units 121, 122, 123 and 124 and the radio frequency transmitters 131, 132, 133 and 134 via a transceiver splitter (unrepresented).

The antennas 111 to 114 convert radio waves received from the LTE base station 2 into LTE reception signals respectively. Furthermore, the antennas 111 to 114 supply the converted LTE reception signals to the radio frequency receivers 121, 122, 123 and 124 via the transceiver splitter, respectively.

In addition, the antennas 111 to 114 are supplied respectively with LTE transmission signals from the radio frequency transmitters 131 to 134 via a transceiver splitter (unrepresented). Each of the antennas 111 to 114 transmit the supplied LTE transmission signals, respectively.

Each of the radio frequency receivers 121 to 124 is supplied with electric current and accomplish a receiving process. As the receiving process, the radio frequency receivers 121 to 124 down-convert the frequencies of the LTE received signals provided from the antennas 111 to 114, respectively, to the baseband band. The radio frequency receivers 121 to 124 output the down-converted signals as signals Sout1 to Sout4, respectively.

In addition, each of the channel frequencies of the radio frequency receivers 121 to 124 is set to the notification channel frequency of the GSM network by the control unit 19. The radio frequency receivers 121 to 124 receive signals from the notification channel sent from the GSM base station 3. The radio frequency receivers 121 to 124 output these notification channel signals as signals Sout1 to Sout4, respectively.

The radio frequency transmitters 131 to 134 create LTE transmission signals by up-converting the frequency of transmission baseband signals supplied from the baseband unit 14. The radio frequency transmitters 131 to 134 provide LTE transmission signals generated by the antennas 111 to 114, respectively, via the transceiver splitter.

The baseband unit 14 accomplishes both LTE baseband transceiver signal processing and GSM baseband transceiver signal processing.

The baseband unit 14 creates four types of layer signals space multiplexed by OFDM (Orthogonal Frequency Division Multiplexing) demodulating the four signals Sout1 to Sout4 in the baseband band supplied from the radio frequency receivers 121 to 124, respectively, as a baseband receiving process.

The baseband unit 14 has a received signal strength detector 14*p*. The received signal strength detector 14*p* detects the signal strength of four types of OFDM demodulated layer signals.

In addition, the baseband unit 14 has a layer demapper, a modulation demapper and an encryption/decryption unit (all unrepresented). The baseband unit 14 creates digital reception data signals by decrypting the four types of layer signals created.

The reception data signals include data signals for data communications and data signals for audio communications. When the reception data signals are data signals for data communications, the baseband unit 14 supplies the reception data signals to the control unit 19.

In addition, the baseband unit 14 has a D/A converter (unrepresented). When the reception data signals are data signals for audio communications, the D/A converter converts the reception data signals to analog audio signals and supplies these to the speaker 15.

On the other hand, the baseband unit 14 converts the data signals supplied from the control unit 19 and the audio signals supplied from the microphone 16 into transmission baseband signals as a baseband transmission process. The baseband unit 14 supplies the transmission baseband signals to the radio frequency transmitters 131 to 134, respectively.

The speaker 15 converts the audio signals supplied from the D/A converter of the baseband unit 14 to audio and outputs these. When audio has been supplied, the microphone 16 converts the supplied audio into audio signals and supplies these to the baseband unit 14.

The dial key 17 receives operational input such as telephone numbers and the like during calls. The dial key 17 supplies operational input signals corresponding to the operational input received to the control unit 19.

The memory unit 18 stores various data. The memory unit 18 is composed of ROM (read only memory), RAM (random access memory), non-volatile memory and the like. The memory unit 18 stores LTE network monitor values, GSM network monitor values and the like as data.

In addition, the memory unit 18 stores data for programs necessary for processes executed by the control unit 19.

The control unit 19 controls the various parts of the wireless transceiver 1 by reading and executing data for programs necessary for processes from the memory unit 18.

The control unit 19 switches the four antennas 111 to 114 at preset time intervals, and receives signals from the LTE base station 2 using the four receiving antennas 111 to 114. In addition, the control unit 19 receives signals from the GSM base station 3 using the four antennas 111 to 114.

The control unit 19 controls the power supply and halting of the power supply to the radio frequency receivers 121 to 124.

When the wireless transceiver 1 receives signals from the LTE base station 2 and the GSM base station 3 using the antennas 111 to 114, the control unit 19 supplies electric current to the radio frequency receivers 121 to 124. On the other hand, when the wireless transceiver 1 does not receive signals from the LTE base station 2 or the GSM base station 3 using the antennas 111 to 114, the control unit 19 halts the supply of electric current to the radio frequency receivers 121 to 124.

In addition, the control unit 19 monitors the reception levels of the LTE network and the GSM network during wait times and data communications times while controlling timing. The control unit 19 has a timer. The timing of monitoring reception levels is controlled by the time measured by this timer.

Next, the operation of the wireless transceiver 1 according to a first exemplary embodiment is described below.

First, the operation of the wireless transceiver 1 during signal wait time is explained.

Figure 3:
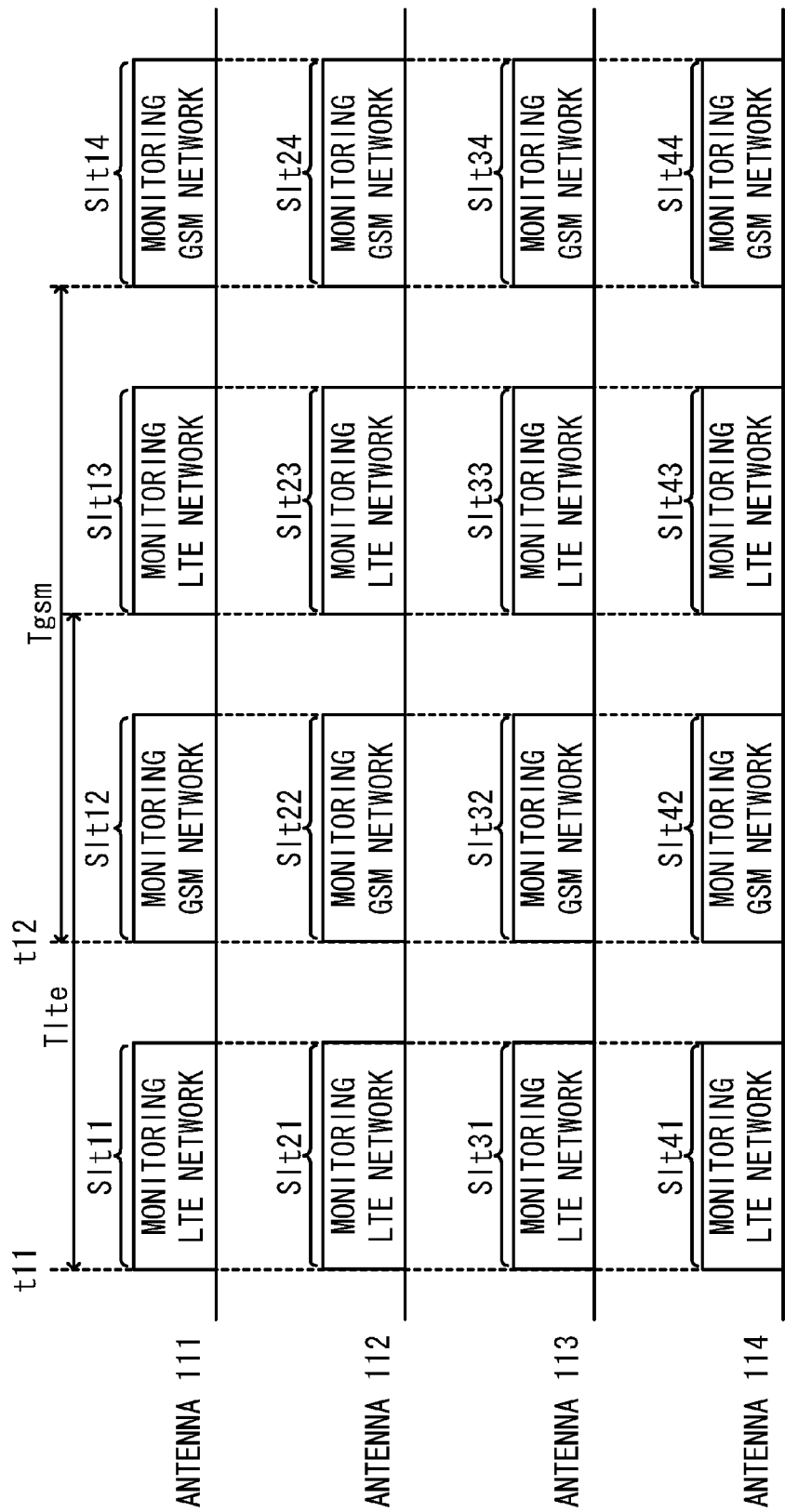
FIG. 3 is a timing chart showing the timing of monitoring reception level on an LTE network and reception level on a GSM network during wait times.

The control unit 19 alternately monitors the reception level in the cell 2*c* of the LTE base station 2 and the reception level in the cell 3*c* of the GSM base station 3 during wait times. FIG. 3 shows the timing of monitoring the reception level in the cell 2*c* of the LTE base station 2 and the reception level in the cell 3*c* of the GSM base station 3 during wait times. In the explanation below, the order of the antennas 111 to 114 is not restricted to the order shown.

During wait times, the control unit 19 monitors the reception level in the cell 2*c* of the LTE base station 2 using the antennas 111 to 114 each period Tlte beginning at time t11 (time slots Slt11, Slt13, Slt21, Slt23, Slt31, Slt33, Slt41, Slt43). This period Tlte is, for example, five seconds.

Specifically, the control unit 19 supplies electric current to the radio frequency receivers 121 to 124, causing the radio frequency receivers 121 to 124 to operate. Power is supplied to the antennas 111 to 114, which each receive radio waves from the LTE base station 2.

The radio frequency receivers 121 to 124 down-convert the frequencies of the LTE reception signals supplied from the antennas 111 to 114, respectively, to the baseband band. Furthermore, the radio frequency receivers 121 to 124 output the down-converted LTE reception signals as signals Sout1 to Sout4, respectively.

The baseband unit 14 OFDM demodulates the signals Sout1 to Sout4 output respectively from the radio frequency receivers 121 to 124 and creates four types of layer signals. The received signal strength detector 14p detects the signal strengths of the four types of demodulated layer signals.

In addition, the control unit 19 monitors the reception level in the cell 3c of the GSM base station 3 using the antennas 111 to 114 each period Tgsm beginning at time t12 (time slots Slt12, Slt14, Slt22, Slt24, Slt32, Slt34, Slt42, Slt44). This period Tgsm is, for example, five seconds.

Specifically, the control unit 19 supplies electric current to the radio frequency receivers 121 to 124, causing the radio frequency receivers 121 to 124 to operate, and sets the channel frequencies of the radio frequency receivers 121 to 124 to the notification channel frequencies from the GSM base station 3.

The radio frequency receivers 121 to 124 each receive notification channel signals transmitted from the GSM base station 3. The radio frequency receivers 121 to 124 respectively output the received signals as signals Sout1 to Sout4. The received signal strength detector 14p of the baseband unit 14 detects the signal strength of the signals demodulated from the output signals.

Figure 4:
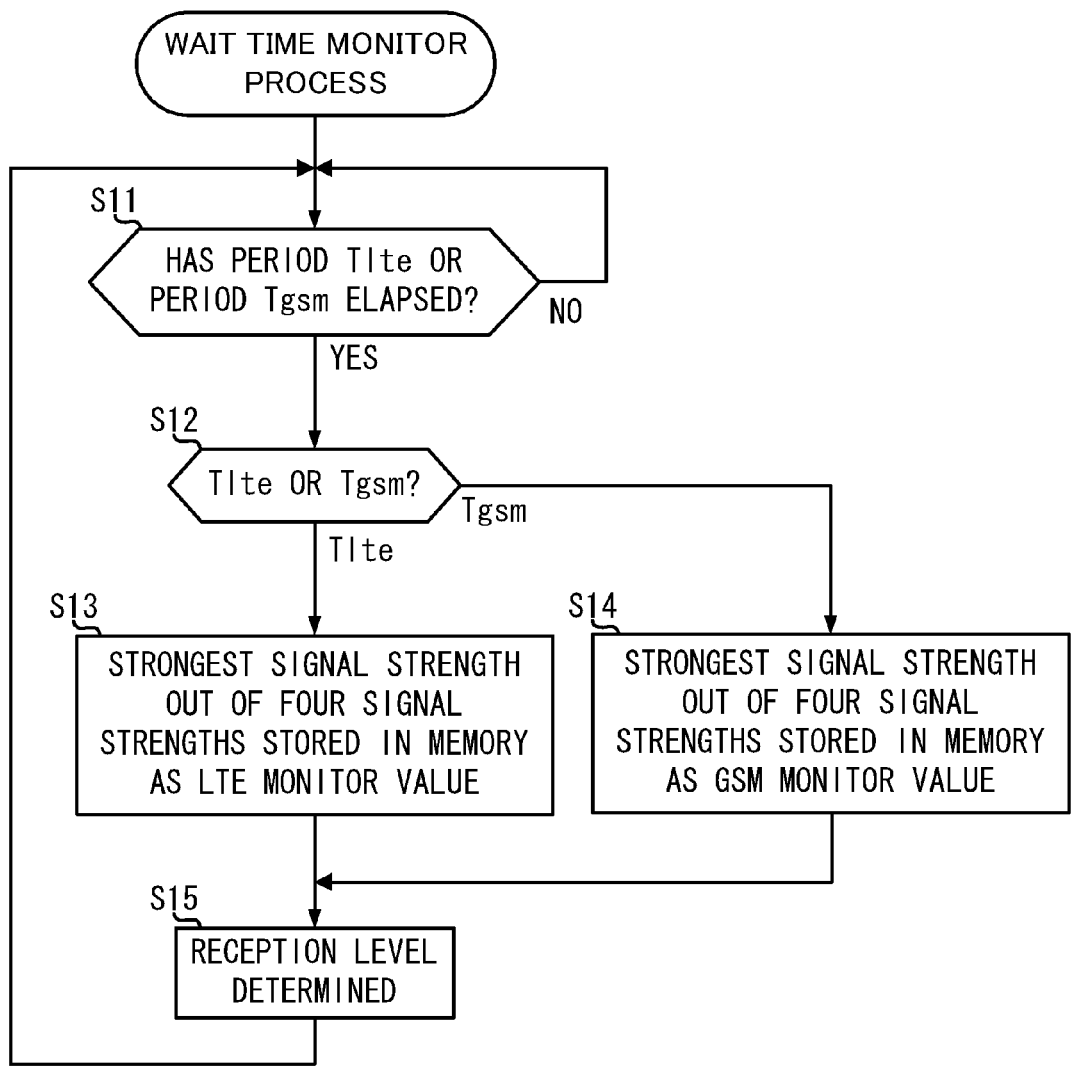
FIG. 4 is a flowchart showing the wait time monitor process executed by the control unit shown in FIG. 1.

The control unit 19 executes a wait process in accordance with the flowchart in shown in FIG. 4. First, the control unit 19 determines whether or not the period Tlte or the period Tgsm has elapsed on the basis of time measured by the timer for the period Tlte and the timer for the period Tgsm (step S11).

When neither the period Tlte nor the period Tgsm has elapsed (step S11; No), the control unit 19 waits until the period T elapses.

When the period Tlte or the period Tgsm has elapsed (step S11; Yes), the control unit 19 determines whether or not the period T that has elapsed is the period Tlte or the period Tgsm (step S12).

When the period T is the period Tlte (step S12; Tlte), the control unit 19 stores the strongest signal strength out of the signal strengths detected by the received signal strength detector 14p in the memory unit 18 as an LTE network monitor value (step S13, time slots Slt11, Slt21, Slt31, Slt41, Slt13, Slt23, Slt33, Slt43 shown in FIG. 3).

The control unit 19 determines the reception level in the cell 2c of the LTE base station 2 based on the LTE network monitor value (step S15). Furthermore, the control unit 19 again waits until the period T elapses.

On the other hand, when the period T is the period Tgsm (step S12; Tgsm), the control unit 19 stores the strongest signal strength out of the signal strengths detected by the received signal strength detector 14p in the memory unit 18 as a GSM network monitor value (step S14, time slots Slt12, Slt22, Slt32, Slt42, Slt14, Slt24, Slt34, Slt44 shown in FIG. 3).

The control unit 19 determines the reception level in the cell 3c of the GSM base station 3 based on the GSM network monitor value (step S15). Furthermore, the control unit 19 again waits until the period Tlte or the period Tgsm elapses.

Next, the operations when the wireless transceiver 1 accomplishes data communications are explained.

The control unit 19 successively switches the antennas 111 to 114 and monitors the reception level in the cell 2c of the LTE base station 2 and the reception level in the cell 3c of the GSM base station 3.

Figure 5:
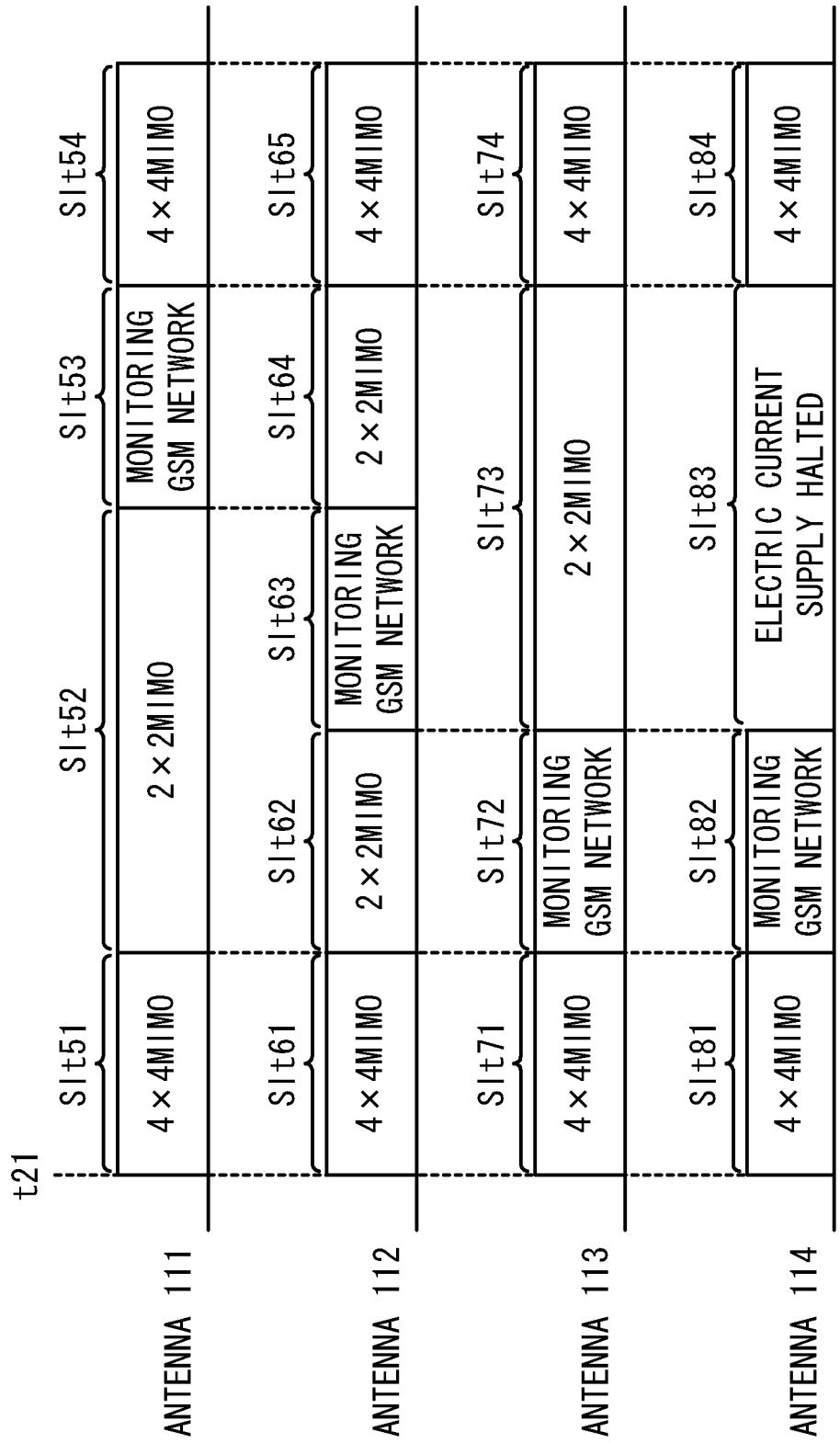
FIG. 5 is a timing chart showing the timing of monitoring reception level on an LTE network and reception level on a GSM network during data communications.

FIG. 5 shows the timing of monitoring the reception level in the cell 2c of the LTE base station 2 and the reception level in the cell 3c of the GSM base station 3 when the wireless transceiver 1 accomplishes data communications. Here, the number of antennas used is four.

During data communications, the control unit 19 switches the four antennas 111 to 114 with the time spacing of each slot and constantly receives signals from the LTE base station 2. In addition, the control unit 19 successively receives signals from the GSM base station 3.

The control unit 19 accomplishes 4×4 MIMO operations from time t21 using the antennas 111 to 114 (time slots Slt51, Slt61, Slt71, Slt81).

After a preset period T (for example, 2 seconds) has elapsed, the control unit 19 changes to 2×2 MIMO operations using the antennas 111 and 112 (time slots Slt52 and Slt62).

Simultaneously, the control unit 19 sets the channel frequency of the radio frequency receivers 123 and 124 to the notification channel frequency of the GSM network. Furthermore, the control unit 19 monitors the reception level of the GSM network using the antennas 113 and 114 (time slots Slt72 and Slt82).

Furthermore, after the period T has elapsed, the control unit 19 continues the 2×2 MIMO operation using the antenna 111 (time slot Slt52). The control unit 19 sets the channel frequency of the radio frequency receiver 122 to the notification channel frequency of the GSM network. Furthermore, the control unit 19 monitors the reception level of the GSM network via the antenna 112 (time slot Slt63).

Simultaneously, the control unit 19 changes to a 2×2 MIMO operation using the antenna 113 (time slot Slt73). The control unit 19 is continuing the 2×2 MIMO operation using the antenna 111 (time slot Slt52), so LTE network communication is maintained through 2×2 MIMO operation using the antenna 111 and the antenna 113.

At this time, reception is not accomplished using the radio frequency receiver 124, so the control unit 19 reduces power consumption by halting the supply of electric current to the radio frequency receiver 124 (time slot Slt83).

Furthermore, after the period T has elapsed, the control unit 19 sets the channel frequency of the radio frequency receiver 121 to the notification channel frequency of the GSM network. Furthermore, the control unit 19 monitors the reception level of the GSM network using the antenna 111 (time slot Slt53).

Simultaneously, the control unit 19 changes to a 2×2 MIMO operation using the antenna 112 (time slot Slt64). The control unit 19 is continuing the 2×2 MIMO operation using the antenna 113 (time slot Slt73), so LTE network communication is maintained through 2×2 MIMO operation using the antenna 112 and the antenna 113.

The control unit 19 continues to halt the supply of electric current to the radio frequency receiver 124 (time slot Slt83).

Because the control unit 19 executes this kind of control, the received signal strength detector 14p detects the signal strengths of the four signals demodulated from the signals Sout1 to Sout4 output respectively from the radio frequency receivers 121 to 124.

Furthermore, after the period T has elapsed, the control unit 19 again causes the radio frequency receivers 121 to 124 to operate. Furthermore, the control unit 19 accomplishes a 4×4 MIMO operation using the antennas 111 to 114 (time slots Slt54, Slt65, Slt74 and Slt84).

Figure 6:
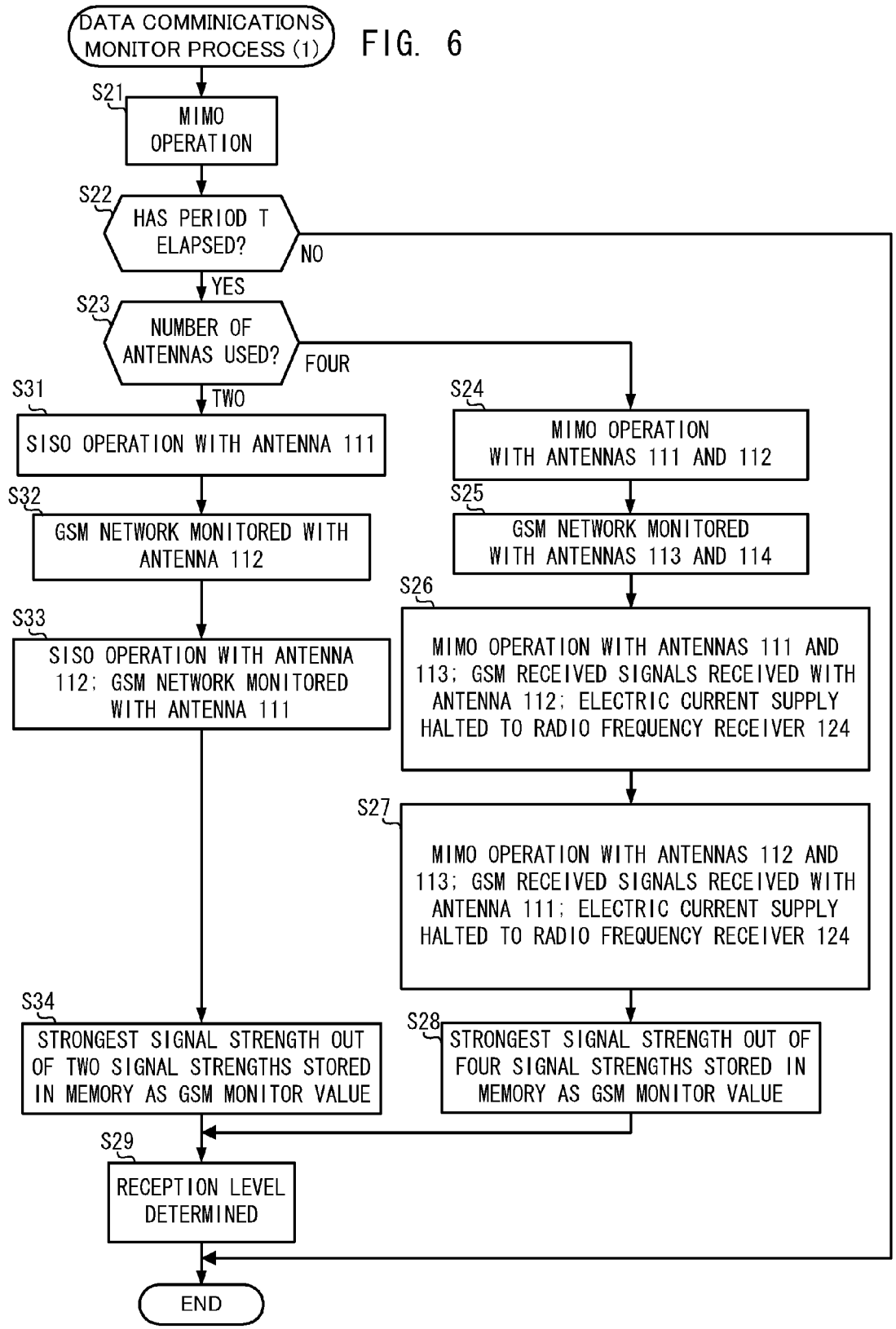
FIG. 6 is a flowchart showing a data communications monitor process (1) executed by the control unit shown in FIG. 1.

The control unit 19 executes the aforementioned data communications monitor process (1) in accordance with the flowchart shown in FIG. 6.

The control unit 19 accomplishes a 4×4 MIMO operation using the antennas 111, 112, 113 and 114 (step S21, time slots Slt51, Slt61, Slt71 and Slt81 shown in FIG. 5).

The control unit 19 determines whether or not the preset period T has elapsed on the basis of time measured by a timer (step S22).

When the preset period T has not elapsed (step S22; No), the control unit 19 concludes the data communications monitor process (1).

On the other hand, when the present period T has elapsed (step S22; Yes), the control unit 19 determines whether the number of antennas being used is two or four (step S23).

When the number of antennas being used in four (step S23; four), the control unit 19 switches from the four antennas 111 to 114 to the two antennas 111 and 112. Furthermore, the control unit 19 accomplishes a 2×2 MIMO operation using the antennas 111 and 112 (step S24, time slots Slt52 and Slt62 shown in FIG. 5).

The control unit 19 monitors the reception level (GSM network) in the cell 3c of the GSM base station 3 using the antennas 113 and 114 (step S25, time slots Slt72 and Slt82 shown in FIG. 5).

Next, the control unit 19 accomplishes a 2×2 MIMO operation using the antennas 111 and 113. In addition, the control unit 19 monitors the reception level (GSM network) in the cell 3c of the GSM base station 3 using the antenna 112. Furthermore, the control unit 19 halts the supply of electric current to the radio frequency receiver 124 (step S26, time slots Slt52, Slt73, Slt63 and Slt83 shown in FIG. 5).

The control unit 19 accomplishes a 2×2 MIMO operation using the antennas 112 and 113. In addition, the control unit 19 monitors the reception level (GSM network) in the cell 3c of the GSM base station 3 using the antenna 111. Furthermore, the control unit 19 continues to halt the supply of electric current to the radio frequency receiver 124 (step S27, time slots Slt64, Slt73, Slt53 and Slt83 shown in FIG. 5).

Through this, the received signal strength detector 14p detects the signal strength of the signals respectively corresponding to the signals Sout1 to Sout4. Furthermore, the control unit 19 stores the highest value of the four signal strengths in the memory unit 18 as the GSM network monitor value (step S28).

The control unit 19 determines the reception level in the cell 3c of the GSM base station 3 based on the GSM network monitor value (step S29).

Furthermore, the control unit 19 concludes the data communications monitor process (1).

Next, the case where the number of antennas used in two will be described. Here, antenna 111 and antenna 112 will be assumed to be used.

The control unit 19 accomplishes a 2×2 MIMO operation using the antennas 111 and 112 (step S21).

The control unit 19 accomplishes a SISO (Single Input Single Output) operation using the antenna 111 (step S31).

The control unit 19 monitors the reception level (GSM network) in the cell 3c of the GSM base station 3 using the antenna 112 (step S32).

Next, the control unit 19 accomplishes a SISO operation using the antenna 12. Furthermore, the control unit 19 monitors the reception level (GSM network) in the cell 3c of the GSM base station 3 using the antenna 111 (step S33).

Through this, the received signal strength detector 14p detects the signal strengths of the signals corresponding to the two signals Sout1 and Sout2. Furthermore, the control unit 19 stores the higher value out of the two signal strengths in the memory unit 18 as the GSM network monitor value (step S34).

The control unit 19 determines the reception level in the cell 3c of the GSM base station 3 on the basis of the GSM network monitor value (step S29).

Furthermore, the control unit 19 concludes the data communications monitor process (1).

In the above-described flowchart, the control unit 19 monitors the reception level (of the LTE network) in the cell 2c of the LTE base station 2 during MIMO operations.

As explained above, with this first exemplary embodiment, the control unit 19 switches the four antennas 111 to 114 at preset time intervals. More specifically, the control unit 19 receives signals from the LTE base station 2 using the four receiving antennas 111 to 114. In addition, the control unit 19 receives signals from the GSM base station using the four antennas 111 to 114.

Accordingly, the wireless transceiver 1 monitors the reception level of the LTE network and the reception level of the GSM network while switching antennas, so it is possible to make the monitored reception levels accurate. As a result, appropriate handovers are possible.

In addition, the wireless transceiver 1 selects the highest reception level, so it is possible to broaden the range where sending signals to and receiving signals from the base station are possible.

(Exemplary Embodiment 2)

The wireless transceiver 1 according to the second exemplary embodiment determines the reception level on the basis of an RSSI (Receive Signal Strength Indicator) value.

Figure 7:
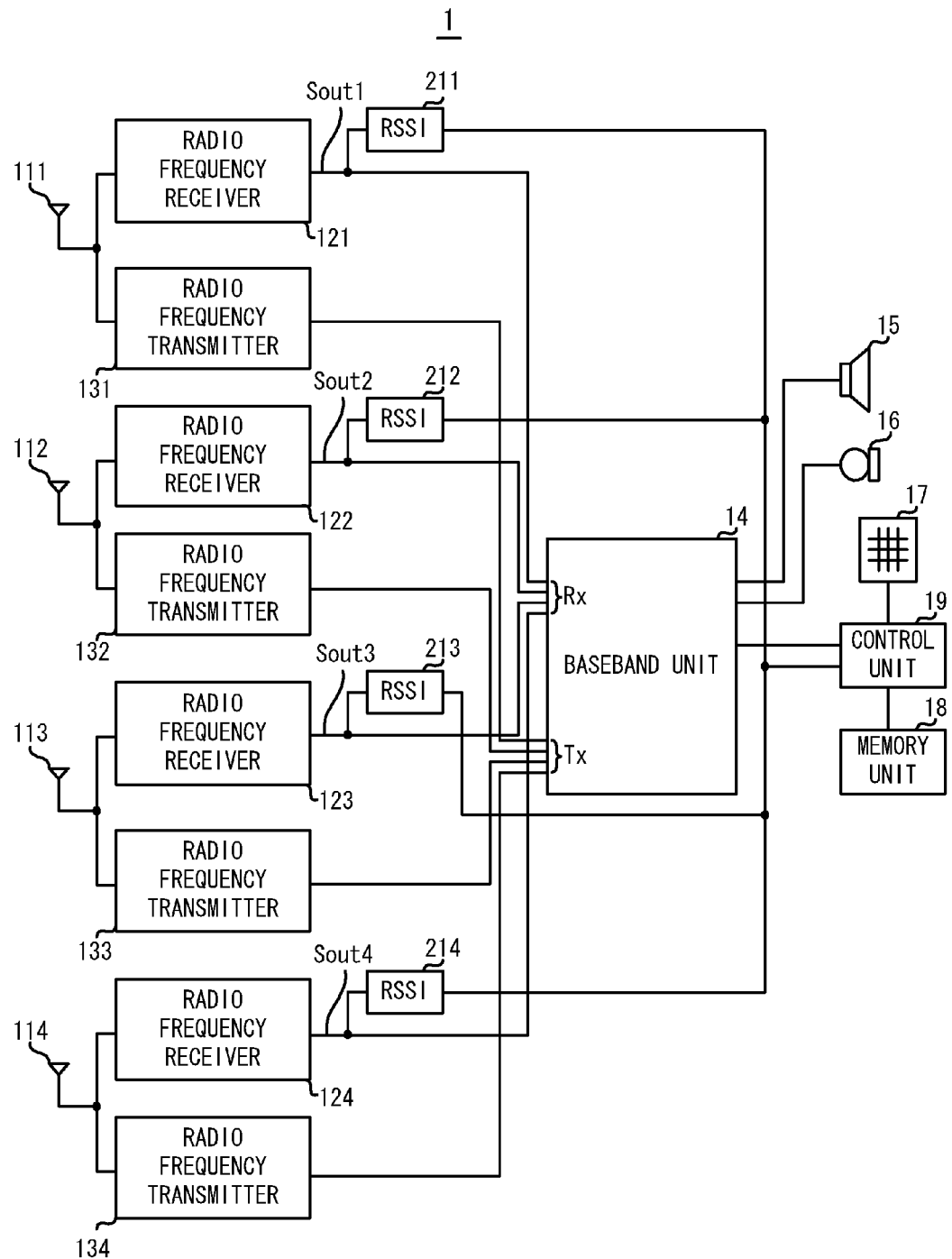
FIG. 7 is a block diagram showing the composition of a wireless transceiver according to a second exemplary embodiment of the present invention.

The wireless transceiver 1 according to the second exemplary embodiment has RSSI detectors 211 to 214 (labeled "RSSI" in the drawing), as shown in FIG. 7.

The RSSI detectors 211 to 214 detect RSSI values indicating the strength of radio wave signals from the signals Sout1 to Sout4 output from the radio frequency receivers 121 to 124, respectively.

The RSSI detectors 211 to 214 respectively supply the detected RSSI values to the control unit 19.

The control unit 19 monitors the reception level of the GSM network on the basis of the RSSI values respectively supplied from the RSSI detectors 211 to 214.

Next, the operation of the wireless transceiver 1 according to the second exemplary embodiment will be described.

In the second exemplary embodiment, the control unit 19 during wait times alternately monitors the reception level in the cell 2c of the LTE base station 2 and the reception level in the cell 3c of the GSM base station 3 in accordance with the timing chart shown in FIG. 3.

At time slots Slt11, Slt21, Slt31, Slt41, Slt13, Slt23, Slt33 and Slt43, the control unit 19 sets the channel frequencies of the radio frequency receivers 121 to 124 to the frequencies for receiving radio waves from the LTE base station 2. In addition, at time slots Slt12, Slt22, S132, Slt42, Slt14, Slt24, Slt34 and Slt44, the control unit 19 sets the channel frequencies of the radio frequency receivers 121 to 124 to the notification channel frequencies of the GSM base station 3.

The radio frequency receivers 121 to 124 respectively output the signals Sout1 to Sout4. The RSSI detectors 211 to 214 respectively detect the signal strength of the signals Sout1 to Sout4.

The RSSI detectors 211 to 214 respectively supply the detected signal strengths to the control unit 19. The control unit 19 stores the strongest signal strength out of the signal strengths detected by the RSSI detectors 211 to 214 in the memory unit 18 as the GSM network monitor value.

In the case of data communications, the control unit 19 alternately monitors the reception levels of the LTE network and the GSM network in accordance with the timing chart shown in FIG. 5. The control unit 19 sets the channel frequencies of the radio frequency receivers 123 and 124 to the notification channel frequencies of the GSM base station 3 at time slots Slt72 and Slt82. In addition, the control unit 19 sets the channel frequencies of the radio frequency receivers 122 and 121 to the notification channel frequencies of the GSM base station 3 at time slots Slt63 and Slt53.

As explained above, with this second exemplary embodiment, the control unit 19 acquires the highest value out of the RSSI values detected by the RSSI detectors 211 to 214 during wait time as the GSM network monitor value.

Accordingly, using the RSSI values the wireless transceiver 1 can monitor the reception level of the GSM network while switching antennas, making it possible to make the monitored reception levels accurate. As a result, appropriate handovers are possible.

In addition, the wireless transceiver 1 selects the highest reception level, so it is possible to broaden the range where sending signals to and receiving signals from the base station are possible.

Similarly, for the LTE network monitor value, the control unit 19 may acquire the strongest signal strength of the signal strengths detected by the RSSI detectors 211, 212, 213 and 214 in MINO operations as the LTE network monitor value.

(Exemplary Embodiment 3)

The wireless transceiver according to a third exemplary embodiment switches the plurality of antennas using RI (Rank Indicator, 3GPP TS30.306, Table 4.1-1).

Figure 8:
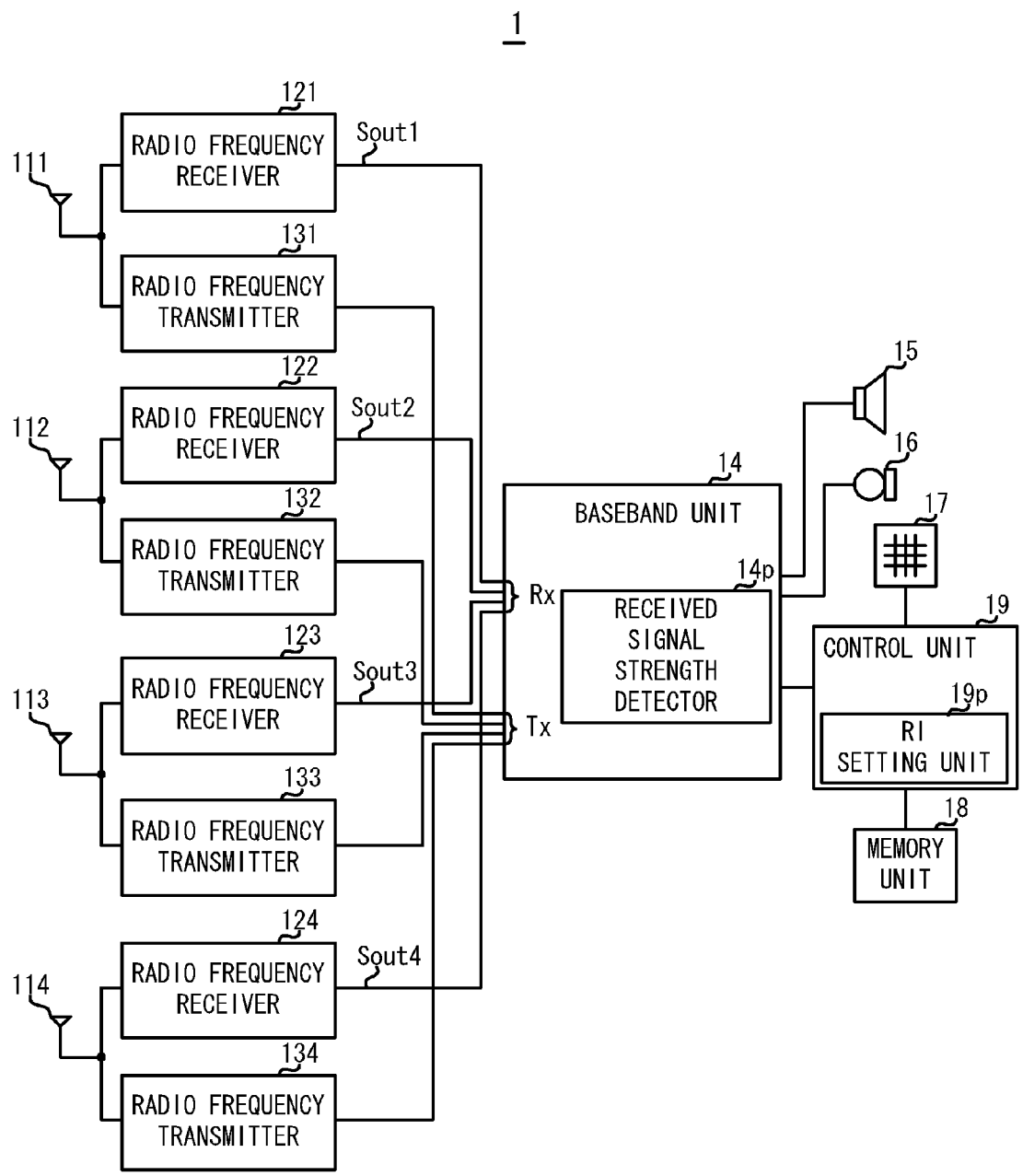
FIG. 8 is a block diagram showing the composition of a wireless transceiver according to a third exemplary embodiment of the present invention.

The control unit 19 in the wireless transceiver 1 according to the third exemplary embodiment has an RI setting unit 19*p*, as shown in FIG. 8.

The RI setting unit 19*p* determines the RI value corresponding to the number of MIMO receiving antennas used. The RI setting unit 19*p* supplies the determined RI value to the baseband unit 14.

The baseband unit 14 encodes the RI value to a PUCCH (Physical Uplink Control Channel) transmission baseband signal. Furthermore, the baseband unit 14 supplies the encoded transmission baseband signal to the radio frequency transmitters 131 to 134.

The radio frequency transmitters 131 to 134 respectively create LTE transmission signals from the transmission baseband signals. The antennas 111 to 114 transmit the created LTE transmission signals to the LTE base station 2.

Next, the operation of the wireless transceiver 1 according to the third exemplary embodiment will be described.

During data communications, the control unit 19 successively switches the antennas 111 to 114 in accordance with the timing chart shown in FIG. 5. Furthermore, the control unit 19 monitors the reception level in the cell 2*c* of the LTE base station 2 and the reception level in the cell 3*c* of the GSM base station 3.

The RI value in the time slots Slt51, Slt61, Slt71 and Slt81 when a 4×4 MIMO operation is executed is 4.

After a preset period T (for example, 2 seconds) has elapsed, the control unit 19 changes to a 2×2 MIMO operation with the antennas 111 and 112 (time slots Slt52 and Slt62). At this time, the control unit 19 controls the radio frequency transmitters 133 and 134, the antenna 113 and the radio frequency receiver 123 and transmits RI=2 by means of the PUCCH signal.

Following this, the control unit 19 simultaneously monitors the reception level of the GSM network using the antennas 113 and 114 (time slots Slt72 and Slt82), the same as in the first exemplary embodiment.

Furthermore, after the period T has elapsed, the control unit 19 continues the 2×2 MIMO operation with the antenna 111 (time slot Slt52). On the other hand, the control unit 19 monitors the reception level of the GSM network using the antenna 112 (time slot Slt63).

At the same time, the control unit 19 changes to a 2×2 MIMO operation using the antenna 113 (time slot Slt73). Because the control unit 19 continues the 2×2 MIMO operation using the antenna 111 (time slot Slt52), communications with the LTE network are preserved through a 2×2 MIMO operation using the antenna 111 and the antenna 113.

At this time, the radio frequency receiver 124 is unnecessary, so the control unit 19 reduces power consumption by halting the supply of electric current to the radio frequency receiver 124 (time slot Slt83).

Furthermore, after the period T has elapsed, the control unit 19 sets the channel frequency of the radio frequency receiver 121 to the notification channel frequency of the GSM network. In addition, the control unit 19 monitors the reception level of the GSM network using the antenna 111 (time slot Slt53).

At the same time, the control unit 19 changes to a 2×2 MIMO operation using the antenna 112 (time slot Slt64). Because the control unit 19 continues the 2×2 MIMO operation using the antenna 113 (time slot Slt73), communications with the LTE network are preserved through a 2×2 MIMO operation using the antenna 112 and the antenna 113.

The control unit 19 continues to halt the supply of electric current to the radio frequency receiver 124 (time slot Slt83).

By the control unit 19 accomplishing this kind of control, the received signal strength detector 14*p* detects the signal strengths of the four signals that were demodulated from the signals Sout1 to Sout4 respectively output from the radio frequency receivers 121 to 124.

Furthermore, after the period T has elapsed, the control unit 19 again causes the radio frequency receivers 121 to 124 to operate. In addition, the control unit 19 accomplishes a 4×4 MIMO operation using the antennas 111 to 114 (time slots Slt54, Slt65, Slt74 and Slt84).

Figure 9:
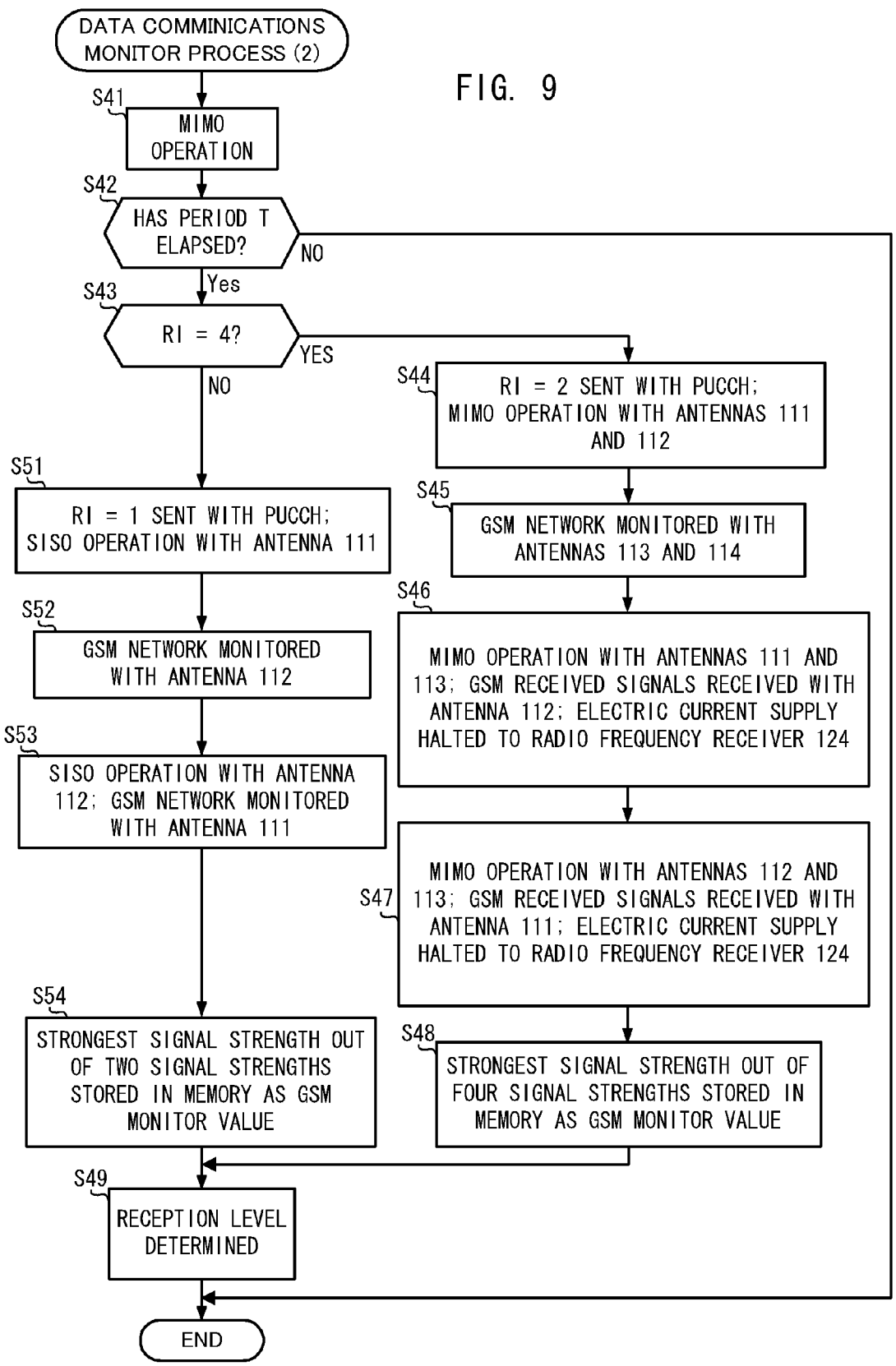
FIG. 9 is a flowchart showing a data communications monitor process (2) executed by the control unit shown in FIG. 8.

The control unit 19 executes the data communications monitor process (2) in accordance with the flowchart shown in FIG. 9.

The control unit 19 accomplishes a 4×4 MIMO operation using the antennas 111, 112, 113 and 114 (step S41, time slots Slt51, Slt61, Slt71 and Slt81 shown in FIG. 5).

The control unit 19 determines whether or not the period T has elapsed on the basis of time measured by the timer (step S42).

When the preset period T has not elapsed (step S42; No), the control unit 19 concludes the data communications monitor process (2).

On the other hand, when the preset period T has elapsed (step S42; Yes), the control unit 19 determines whether or not the RI value is 4 (step S43).

When the RI value is 4 (step S43; Yes), the control unit 19 changes the RI=4 set by the RI setting unit 19*p* to RI=2. Furthermore, the control unit 19 controls each unit so that RI=2 is transmitted by the PUCCH signal. In addition, the control unit 19 accomplishes a MIMO operation using the antennas 111 and 112 (step S44, time slots Slt52 and Slt62 shown in FIG. 5).

The control unit 19 monitors the reception level (GSM network) in the cell 3*c* of the GSM base station 3 using the antennas 113 and 114 (step S45, time slots Slt72 and Slt82 shown in FIG. 5).

Next, the control unit 19 accomplishes a 2×2 MIMO operation using the antennas 111 and 113. Furthermore, the control unit 19 monitors the reception level (GSM network) in the cell 3c of the GSM base station 3 using the antenna 112. Furthermore, the control unit 19 halts the supply of electric current to the radio frequency receiver 124 (step S46, time slots Slt52, Slt73, Slt63 and Slt83 shown in FIG. 5).

The control unit 19 accomplishes a 2×2 MIMO operation using the antennas 112 and 113. Furthermore, the control unit 19 monitors the reception level (GSM network) in the cell 3c of the GSM base station 3 using the antenna 111. Furthermore, the control unit 19 continues to halt the supply of electric current to the radio frequency receiver 124 (step S47; time slots Slt64, Slt73, Slt53 and Slt83 shown in FIG. 5).

Through this, the received signal strength detector 14p detects the signal strengths of the signals respectively corresponding to the signals Sout1 to Sout4. In addition, the control unit 19 stores the highest value out of the four signal strengths in the memory unit 18 as the GSM network monitor value (step S48).

The control unit 19 determines the reception level in the cell 3c of the GSM base station 3 on the basis of the GSM network monitor value (step S49).

Furthermore, the control unit 19 concludes the data communications monitor process (2).

On the other hand, when the RI value is 2 (step S43, No), the control unit 19 changes the RI value set by the RI setting unit 19p to 1. Furthermore, the control unit 19 controls each unit so that RI=1 is transmitted by the PUCCH signal. In addition, the control unit 19 accomplishes a SISO operation using the antenna 111 (step S51).

The control unit 19 monitors the reception level (GSM network) in the cell 3c of the GSM base station 3 using the antenna 112 (step S52).

The control unit 19 accomplishes a SISO operation using the antenna 112. In addition, the control unit 19 monitors the GSM network using the antenna 111 (step S53).

The received signal strength detector 14p detects the various signal strengths of the signals corresponding to the two signals Sout1 and Sout2. In addition, the control unit 19 stores the higher value out of these two signal strengths in the memory unit 18 as the GSM network monitor value (step S54).

The control unit 19 determines the reception level in the cell 3c of the GSM base station 3 on the basis of the GSM network monitor value (step S49).

In addition, the control unit 19 concludes the data communications monitor process (2).

In the above-described flowchart, the control unit 19 monitors the reception level (LTE network) in the cell 2c of the LTE base station 2 through the MIMO operation.

As explained above, with this third exemplary embodiment, the control unit 19 switches multiple antennas using the RI value.

Accordingly, the wireless transceiver 1 monitors the reception level of the LTE network and the reception level of the GSM network while switching antennas, so it is possible to make the monitored reception levels accurate. As a result, appropriate handovers are possible.

In addition, the wireless transceiver 1 selects the highest reception level, so it is possible to broaden the range where sending signals to and receiving signals from the base station are possible.

(Exemplary Embodiment 4)

With the wireless transceiver according to a fourth exemplary embodiment, the baseband unit 14 accomplishes an LTE baseband transceiver signal process and also accomplishes a baseband transceiver signal process for the GPRS (General Packet Radio Service) method of the GSM system.

The composition of the wireless transceiver 1 according to the fourth exemplary embodiment is the same as the composition shown in FIG. 1. However, the baseband unit 14 accomplishes the above-described LTE baseband transceiver process and the baseband transceiver process for the GPRS format of the GSM system. The wireless transceiver 1 operates with the Multislot Class=12 (ETSI standard GSM 05.02 Annex B.1) of GPRS.

Next, the operation of the wireless transceiver 1 according to the fourth exemplary embodiment will be described.

Figure 10:
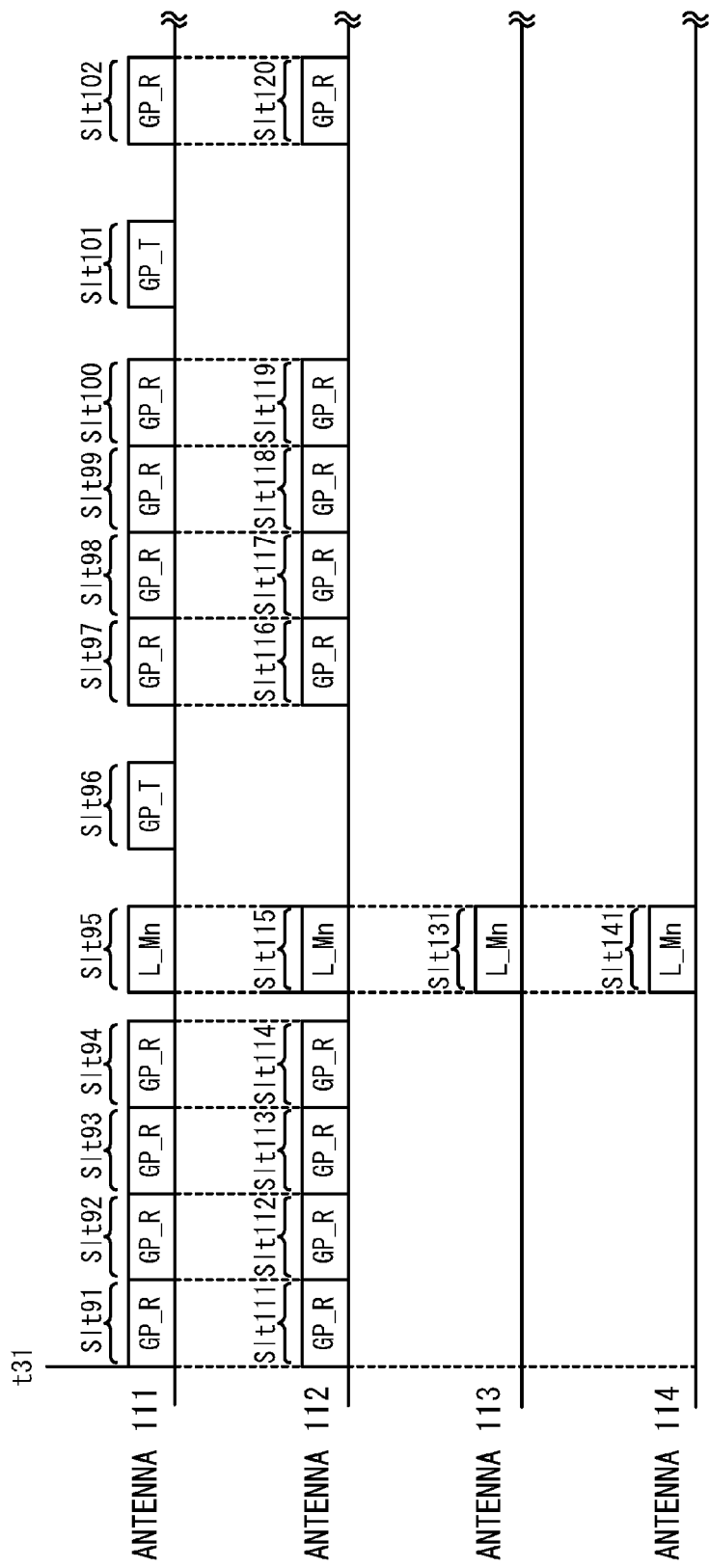
FIG. 10 is a timing chart showing the timing of monitoring reception level on an LTE network and reception level on a GSM network during data communications by a wireless transceiver according to a fourth exemplary embodiment of the present invention.

The wireless transceiver 1 operates with reception diversity using the antennas 111 and 112. The antenna 111 and the radio frequency receiver 121 successively receive signals in the GPRS signal slots Slt91, Slt92, Slt93 and Slt94, as shown in FIG. 10. The antenna 112 and the radio frequency receiver 122 successively receive signals in the GPRS signal slots Slt111, Slt112, Slt113 and Slt114.

After two time slots, the radio frequency transmitter 131 and the antenna 111 transmit the signals in the GPRS transmission slot Slt96. At this time, the reception level (LTE network) in the cell 2c of the LTE base station 2 is monitored with a period Tlte (for example, 2 seconds) between the GPRS reception slot Slt94 and the GPRS transmission slot Slt96 (time slots Slt95, Slt115, Slt131 and Slt141).

The control unit 19 stores the strongest signal strength out of the signal strengths detected by the received signal strength detector 14p in the memory unit 18 as the LTE network monitor value.

In this way, the wireless transceiver 1 monitors the LTE reception level while switching antennas and the highest reception level is selected, so the range in which transmission to and reception from the LTE base station 2 can be accomplished can be broadened.

As explained above, with this fourth exemplary embodiment the baseband unit 14 accomplishes the LTE baseband transceiver signal process and accomplishes the baseband transceiver signal process of the GPRS format for the GSM system. Consequently, following this method the wireless transceiver 1 can monitor the reception level of the LTE base station 2.

(Exemplary Embodiment 5)

The wireless transceiver according to a fifth exemplary embodiment sets the average value of the plurality of signal strengths received by a plurality of antennas as the GSM network monitor value.

In Exemplary Embodiments 1 through 3, the antenna spacing of the antennas 111 to 114 in the wireless transceiver 1 is set to at least $\lambda/2$, where $\lambda$ is the wavelength of the carrier waves, in order to obtain the space multiplexing effect with the MIMO format. Consequently, the correlation coefficient among signal strengths is low.

In addition, in Exemplary Embodiments 1 through 3, the maximum value of the reception level is selected as the monitor value.

On the other hand, in a fading environment, the signal strengths of the signals received by the antennas 111 to 114 fluctuate on the time axis. In order to absorb these fluctuations and obtain a stable value, one method is to obtain the average value (representative value) of the four spatially separated antennas 111 to 114.

Hence, in this fifth exemplary embodiment, the average value of the signal strengths received by the plurality of antennas 111 to 114 is set as the GSM network monitor value. Representative value is a general term for a statistical quantity representing the position of a distribution. Besides average value, representative values also include the median and the mode. In the present exemplary embodiment, an explanation will be given wherein the average value is the representative value. However, the representative value may also be the median or the mode.

Figure 11:
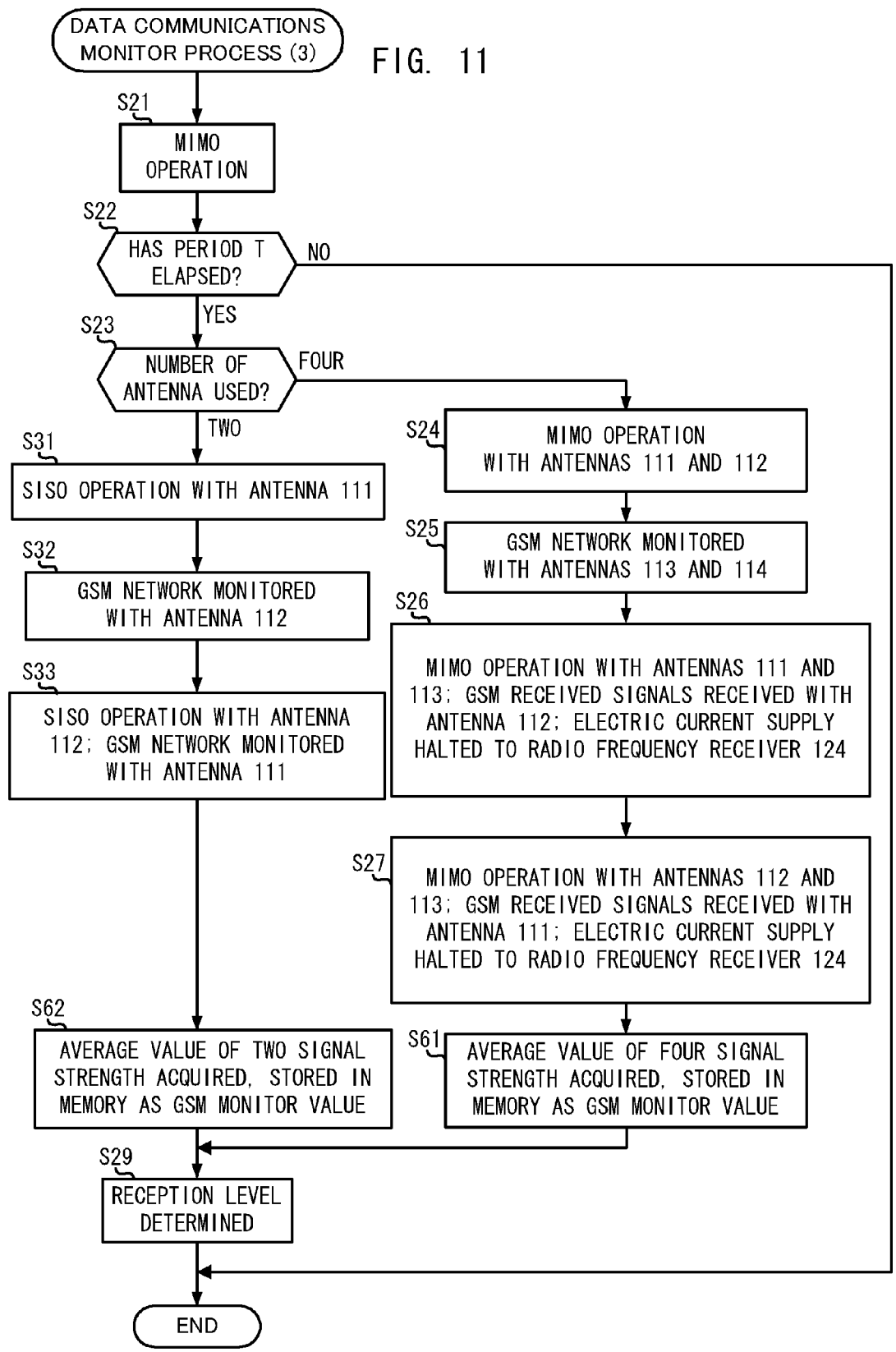
FIG. 11 is a flowchart showing a data communications monitor process (3) executed by the control unit of a wireless transceiver according to a fifth exemplary embodiment of the present invention.

Specifically, the control unit 19 executes the data communications monitor process (3) in accordance with the flowchart shown in FIG. 11.

The control unit 19 executes steps S21, S22 and S23 the same as in the data communications monitor process (1). When the number of antennas used is four (step S23, 4), the control unit 19 executes steps S24 to S27.

Furthermore, the received signal strength detector 14p detects the signal strengths when notification channel signals transmitted from the GSM base station 3 are received by the antennas 111 to 114, respectively. The control unit 19 obtains the average value of the detected signal strengths. The control unit 19 stores the obtained average value in the memory unit 18 as the GSM network monitor value (step S61).

The control unit 19 determines the reception level in the cell 3c of the GSM base station 3 on the basis of the GSM network monitor value (step S29).

Furthermore, the control unit 19 concludes the data communications monitor process (3).

When the number of antennas used is 2 (step S23, 2), the control unit 19 executes steps S31 to S33 the same as in the data communications monitor process (1).

Furthermore, the control unit 19 obtains the average value of the signal strengths detected by the received signal strength detector 14p. The control unit 19 stores the obtained average value in the memory unit 18 as the GSM network monitor value (step S62).

The control unit 19 determines the reception level in the cell 3c of the GSM base station 3 on the basis of the GSM network monitor value (step S29).

Furthermore, the control unit 19 concludes the data communications monitor process (3).

In the above-described flowchart, the control unit 19 monitors the reception level (LTE network) in the cell 2c of the LTE base station 2 through a MIMO operation.

These kinds of methods can be applied during wait operations. That is to say, during wait operations, when stable values are acquired even in a fading environment, the control unit 19 executes steps S61 and S62 shown in FIG. 11 instead of executing steps S13 and S14, respectively, in the wait time monitor process shown in FIG. 4 (time slots Slt11, Slt21, Slt31, Slt41, Slt13, Slt23, Slt33, Slt43, Slt12, Slt22, Slt32, Slt42, Slt14, Slt24, Slt34 and Slt44 shown in FIG. 3).

In addition, these kinds of methods can be applied to the second exemplary embodiment also. That is to say, when stable values are acquired even in a fading environment, the control unit 19 acquires the average value of the signal strengths detected by the received signal strength detector 14p in the time slots Slt12, Slt22, Slt32, Slt42, Slt14, Slt24, Slt34 and Slt44 shown in the timing chart in FIG. 3. The control unit 19 stores the acquired average value in the memory unit 18 as the GSM network monitor value.

In addition, these kinds of methods can be applied to the third exemplary embodiment also. That is to say, in the data communications monitor process (2) shown in FIG. 9, when stable values are acquired even in a fading environment, the control unit 19 executes steps S61 and S62 shown in FIG. 11 instead of executing steps S48 and S54, respectively (time slots Slt51, Slt61, Slt71, Slt81, Slt54, Slt65, Slt74 and Slt84 shown in FIG. 5).

As described above, with this fifth exemplary embodiment, the wireless transceiver 1 monitors the reception level of the LTE base station 2 and the reception level of the GSM base station 3 on the basis of the average value of the signal strengths detected by the received signal strength detector 14p.

Accordingly, in a fading environment, even when the signal strengths of the signals received by the antennas 111 to 114 fluctuate on the time axis, the wireless transceiver 1 can absorb those fluctuations and acquire a stable value. Consequently, even in a fading environment, the wireless transceiver 1 monitors the reception level of the LTE network and the reception level of the GSM network while switching antennas, so it is possible to make the monitored reception levels accurate. As a result, appropriate handovers are possible.

In addition, the wireless transceiver 1 selects the highest reception level, so it is possible to broaden the range where sending signals to and receiving signals from the base station are possible.

(Exemplary Embodiment 6)

The wireless transceiver 1 according to a sixth exemplary embodiment has eight antennas.

In the above-described first through fifth exemplary embodiments, the explanation was for a 4×4 MIMO format, with 4 as the number of antennas.

Figure 12:
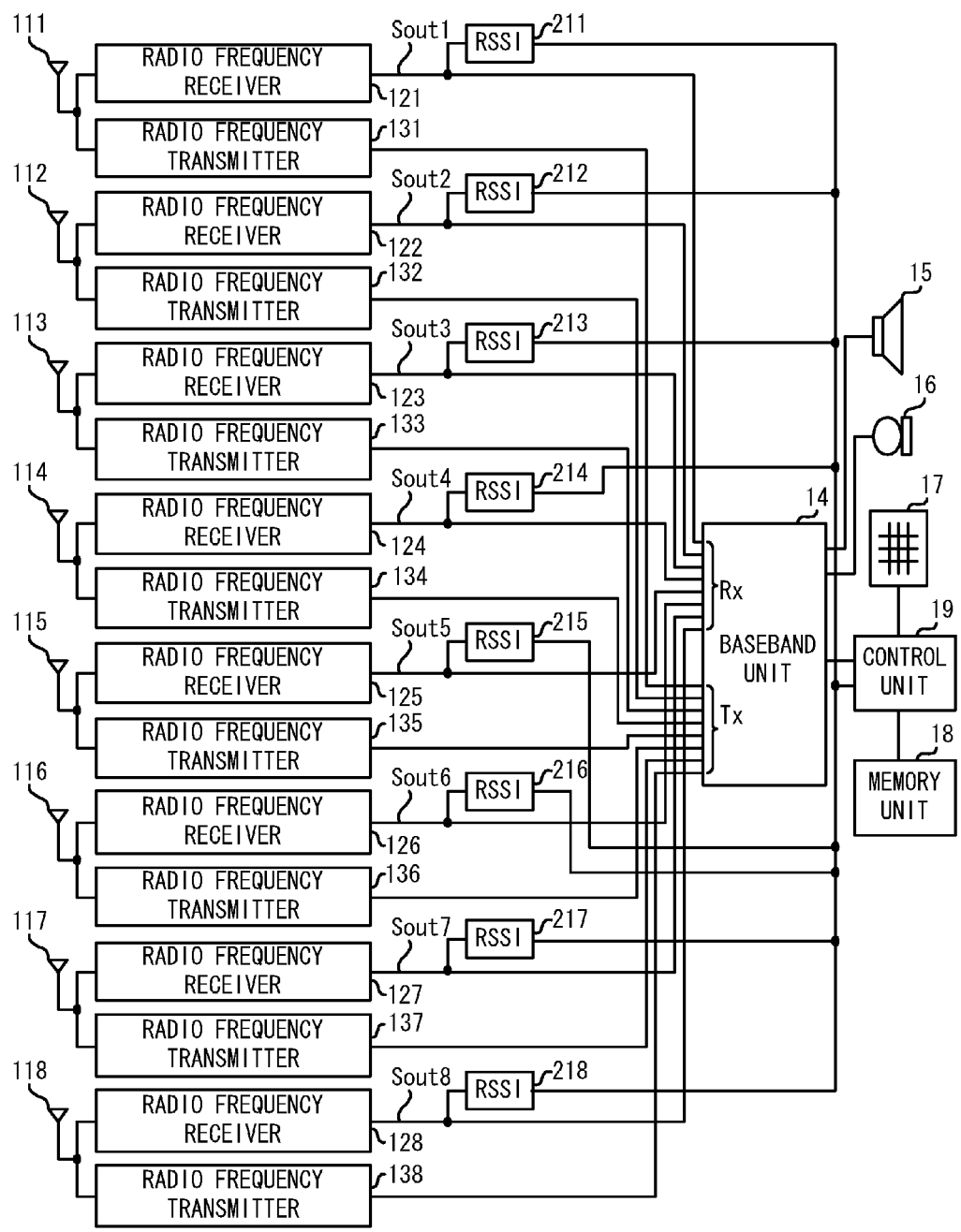
FIG. 12 is a block diagram showing the composition of a wireless transceiver according to a sixth exemplary embodiment of the present invention.

However, in general the wireless transceiver 1 can be expanded to L with a K×L (where K and L are both natural numbers) MIMO format. When L=8, the wireless transceiver 1 has antennas 111 to 118, radio frequency receivers 121 to 128, radio frequency transmitters 131 to 138 and RSSI detectors 211 to 218, as shown in FIG. 12.

In place of the RSSI detectors 211 to 218, a diversity processing unit may be used.

During data communications, the control unit 19 executes a data communications monitor process in accordance with the timing chart shown in FIG. 13.

(Exemplary Embodiment 7)

The wireless transceiver 1 according to a seventh exemplary embodiment accomplishes data communications with an LTE base station 2 having two antennas.

Figure 14:
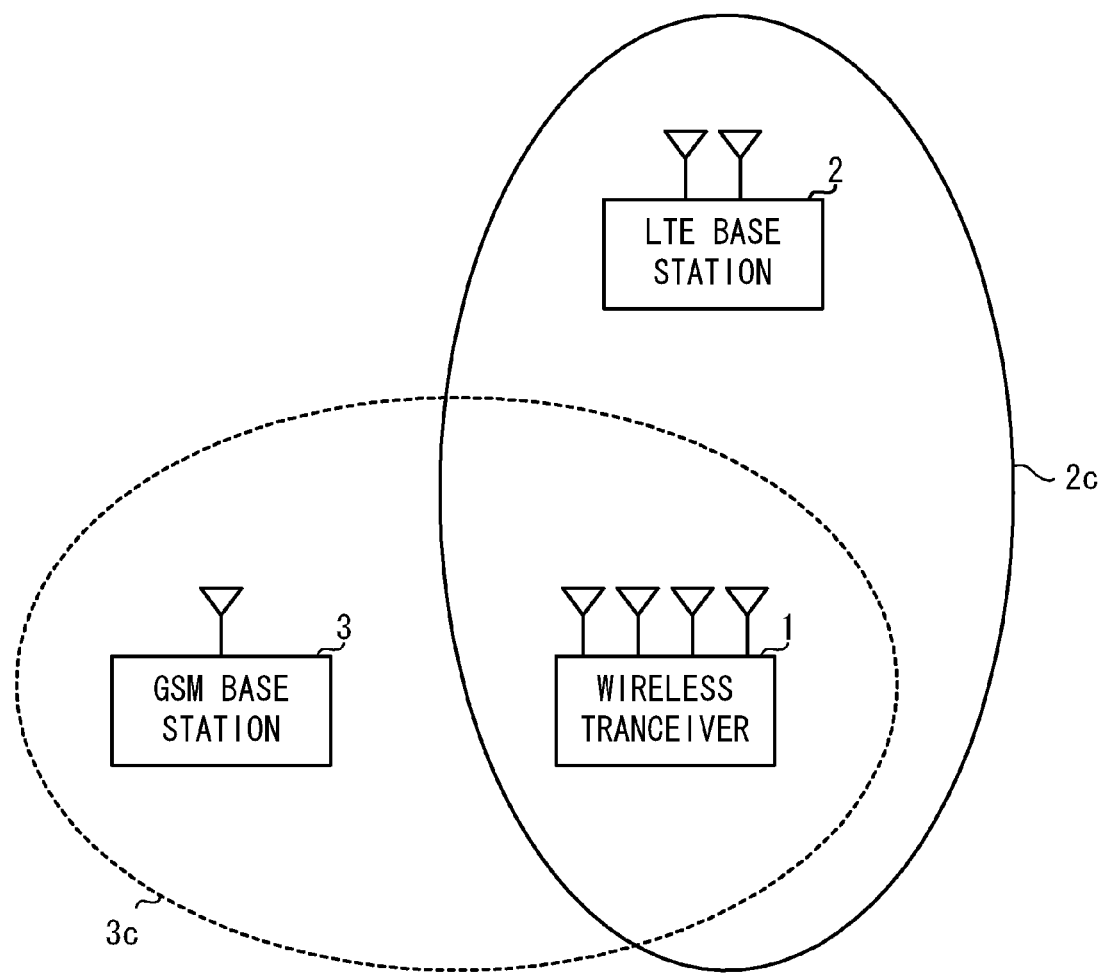
FIG. 14 is a block diagram showing the composition of a wireless transceiver according to a seventh exemplary embodiment of the present invention, an LTE base station and a GSM base station.

In the wireless system according to the seventh exemplary embodiment, the LTE base station 2 has two antennas, as shown in FIG. 14.

The wireless transceiver 1 has four antennas 111 to 114. Furthermore, this wireless system operates in accordance with a 2×4 MIMO format. Other than this point, this transceiver is the same as in exemplary embodiments 1 through 6.

In this manner, even when the LTE base station 2 has two antennas, the wireless transceiver 1 operates similar to exemplary embodiments 1 through 6. Accordingly, the wireless transceiver 1 monitors the reception level of the LTE network and the reception level of the GSM network while switching antennas, so it is possible to make the monitored reception levels accurate. As a result, appropriate handovers are possible.

In addition, the wireless transceiver 1 selects the highest reception level, so it is possible to broaden the range where sending signals to and receiving signals from the base station are possible.

In embodying the present invention, a variety of configurations can be conceived, and the present invention is not limited to the above-described exemplary embodiments.

For example, in the above-described exemplary embodiments, the explanation was such that the program was stored in advance in the memory or the like. However, programs for causing all or a portion of the wireless communications device to operate, or for executing the above-described processes, may be stored on a recording medium readable by computer, such as a flexible disk, CD-ROM (Compact Disk Read-Only Memory), DVD (Digital Versatile Disk), MO (Magneto Optical Disk) or the like. Furthermore, through the distributed recording medium, the program can be installed on other computers and the wireless communications device may be caused to operate as the above-described unit, or the above-described processes may be executed on the wireless communications device.

Furthermore, the program may be stored in a disk device or the like possessed by a service device on the Internet. For example, the program may be placed on the carrier wave and downloaded to a computer.

Having described and illustrated the principles of this application by reference to one or more preferred exemplary embodiments, it should be apparent that the preferred exemplary embodiments may be modified in arrangement and detail without departing from the principles disclosed herein and that it is intended that the application be construed as including all such modifications and variations insofar as they come within the spirit and scope of the subject matter disclosed herein.h

What is claimed is:

1. A wireless communications device, comprising:
    N (where N≥4) receiving antennas (111, 112, 113, 114) for receiving signals from a first base station (LTE 2) and a second base station (GSM 3) having differing wireless formats;
    a reception control unit for switching the N receiving antennas at predetermined time intervals, receiving signals from the first base station (LTE 2) using M (where 2≤M≤N) of the receiving antennas and receiving signals from the second base station (GSM 3) using the N receiving antennas;
    signal strength detector for detecting signal strengths respectively corresponding to signals received from the first base station or the second base station by the receiving antennas; and
    reception level determination units for determining a reception level in a cell of the first base station on the basis of the M signal strengths detected by the signal strength detector when signals are received from the first base station using M of the receiving antennas, and determining a reception level in a cell of the second base station on the basis of N signal strengths detected by the signal strength detector when signals are received from the second base station using the N receiving antennas, wherein,
    the reception control unit
    i) constantly receives signals from the first base station (LTE 2) during first time intervals from N receiving antennas, and during second time intervals by switching between the M (N>M) receiving antennas and
    ii) successively receives signals from the second base station (GSM 3) during said second time intervals by switching between sets of (N-M) antennas when N>M and 2≤N-M.

2. The wireless communications device according to claim 1, wherein the reception control unit receives signals from the first base station and signals from the second base station by alternately switching the N receiving antennas receiving signals from the first base station and the N receiving antennas receiving signals from the second base station during wait times at least at said time intervals.

3. The wireless communications device according to claim 1, wherein the reception level determination units determines the reception level in the cell of the first base station on the basis of the strongest signal strength out of the M signal strengths detected by the signal strength detector when signals are received from the first base station using M receiving antennas, and determines the reception level in the cell of the second base station on the basis of the strongest signal strength out of the N signal strengths detected by the signal strength detector when signals are received from the second base station using N receiving antennas.

4. The wireless communications device according to claim 1, wherein the reception level determination units determine the reception level in the cell of the first base station on the basis of a representative value of the M signal strengths detected by the signal strength detector when signals are received from the first base station using M receiving antennas, and determine the reception level in the cell of the second base station on the basis of a representative value out of the N signal strengths detected by the signal strength detector when signals are received from the second base station using N receiving antennas.

5. The wireless communications device according to claim 1, wherein the first base station is a base station that sends and receives signals in accordance with the LTE (Long Term Evolution) format, and the second base station is a base station that sends and receives signals in accordance with the GSM (Global System for Mobile communications) format.

6. The wireless communications device according to claim 5, wherein,
    the data channels for data transmission are partitioned by the time intervals into transmission slots and reception slots, and
    the reception control unit
    i) transmits and receives signals to and from the second base station (GSM 3) using M receiving antennas (111, 112) respectively during the GPRS (General Packet Radio Service) transmission and reception slots, and
    ii) receives signals from the first base station (LTE 2) using N receiving antennas (111, 112, 113, 114) during the LTE (Long Term Evolution) receiving slots.

7. The wireless communications device according to claim 5, further comprising a reception processing unit that down-converts signals the receiving antennas have received from the first base station and creates a signal in the baseband band;
    wherein the signal strength detector detects the signal strengths of the signals created by the reception processing unit.

8. The wireless communications device according to claim 5, further comprising a receiver that receives notification channel signals from the second base station by setting the channel frequency to the frequency of notification channel signals transmitted by the second base station;
    wherein the signal strength detector detects the signal strength of the notification channel signals received by the receiver.

9. The wireless communications device according to claim 1, wherein the signal strength detector is an RSSI detector for detecting RSSI (Receive Signal Strength Indicator) values for signals created by the reception processing unit.

10. A reception level determination method for a wireless communications device comprising N (where N≥4) receiving antennas for receiving signals from a first base station and a second base station having differing wireless formats, comprising:
    a step for switching the N receiving antennas at predetermined time intervals, receiving signals from the first base station using M (where 2≤M≤N) of the receiving antennas and receiving signals from the second base station using the N receiving antennas;

a step for detecting the respective signals strengths corresponding to signals received from the first base station or the second base station by the receiving antennas; and a step for acquiring both reception levels by determining the reception level in a cell of the first base station on the basis of the M signal strengths detected when signals are received from the first base station using M of the receiving antennas, and determining the reception level in a cell of the second base station on the basis of N signal strengths detected when signals are received from the second base station using the N receiving antennas, wherein, the switching step i) constantly receives signals from the first base station (LTE 2) during first time intervals from N receiving antennas, and during second time intervals by switching between the M (N>M) receiving antennas, and ii) successively receives signals from the second base station (GSM 3) during said second time intervals by switching between sets of (N-M) antennas when N>M and 2≤N-M.

11. A non-transitory computer-readable recording medium on which is recorded a program that, when executed by a computer, causes the computer to execute:

a procedure for switching N (where N≥4) receiving antennas receiving signals from a first base station and a second base station having differing wireless formats at predetermined time intervals, receiving signals from the first base station using M (where 2≤M≤N) of the receiving antennas and receiving signals from the second base station using the N receiving antennas;

a procedure for detecting the respective signals strengths corresponding to signals received from the first base station or the second base station by the receiving antennas; and a procedure for acquiring both reception levels by determining the reception level in a cell of the first base station on the basis of the M signal strengths detected when signals are received from the first base station using M of the receiving antennas, and determining the reception level in a cell of the second base station on the basis of N signal strengths detected when signals are received from the second base station using the N receiving antennas, wherein, the switching procedure provides for i) constantly receiving signals from the first base station (LTE 2) during first time intervals from N receiving antennas, and during second time intervals by switching between the M (N>M) receiving antennas and ii) successively receiving signals from the second base station (GSM 3) during said second time intervals by switching between sets of (N-M) receiving antennas when N>M and 2≤N-M.

\* \* \* \* \*